United States Patent [19]

Ramadan

[11] Patent Number: 4,583,234
[45] Date of Patent: Apr. 15, 1986

[54] DECISION FEEDBACK EQUALIZING APPARATUS

[75] Inventor: Montaz Ramadan, Richardson, Tex.
[73] Assignee: Rockwell International Corporation, El Segundo, Calif.
[21] Appl. No.: 523,204
[22] Filed: Aug. 15, 1983
[51] Int. Cl.$^4$ .................... H03H 7/30; H03K 5/159
[52] U.S. Cl. ........................................ 375/11; 333/18; 364/724
[58] Field of Search ............... 375/5, 27, 30, 11, 12, 375/13, 14, 15, 16, 18; 333/18, 28 R; 364/724, 161, 162, 165; 318/561

[56] References Cited

U.S. PATENT DOCUMENTS

| | | | |
|---|---|---|---|
| 3,305,798 | 2/1967 | Rappeport | 333/28 |
| 3,508,153 | 4/1970 | Gerrish et al. | 375/16 |
| 3,644,719 | 2/1972 | Rouxel et al. | 318/561 |
| 3,864,554 | 2/1975 | Chevalier et al. | 364/161 |
| 3,963,911 | 6/1976 | Franks | 333/28 R |
| 4,215,311 | 7/1980 | Kittel et al. | 375/5 |
| 4,243,956 | 1/1981 | Lemoussu et al. | 333/18 |
| 4,371,972 | 2/1983 | Schwarz et al. | 375/30 |
| 4,422,175 | 12/1983 | Bingham et al. | 375/14 |
| 4,439,863 | 3/1984 | Bellamy | 375/18 |

OTHER PUBLICATIONS

Ackroyd & Liu, "Limit Cycle Suppression in Digital Filters Conference", Saraga Memorial Colloquium on Electronic Filters in Telecommunication, London, England, May 14, 1982.
Lockhart, "Digital Encoding and Filtering Using Delta Modulation", IERE Conference on Digital Processing of Signal in Communications Held in Loughborough from Apr. 11th to 13th, 1972.

Primary Examiner—Robert L. Griffin
Assistant Examiner—Stephen Chin
Attorney, Agent, or Firm—Bruce C. Lutz; V. L. Sewell; H. Fredrick Hamann

[57] ABSTRACT

A block diagram and concept approach for use in conjunction in decision feedback equalization of providing positive decision feedback to enhance the amplitude of the present bit at the same time as delayed intersymbol interference feedback is provided to provide a larger eye pattern in the compensated and equalized output signal as compared to that obtained without the positive decision feedback pulse amplitude enhancement.

12 Claims, 1 Drawing Figure

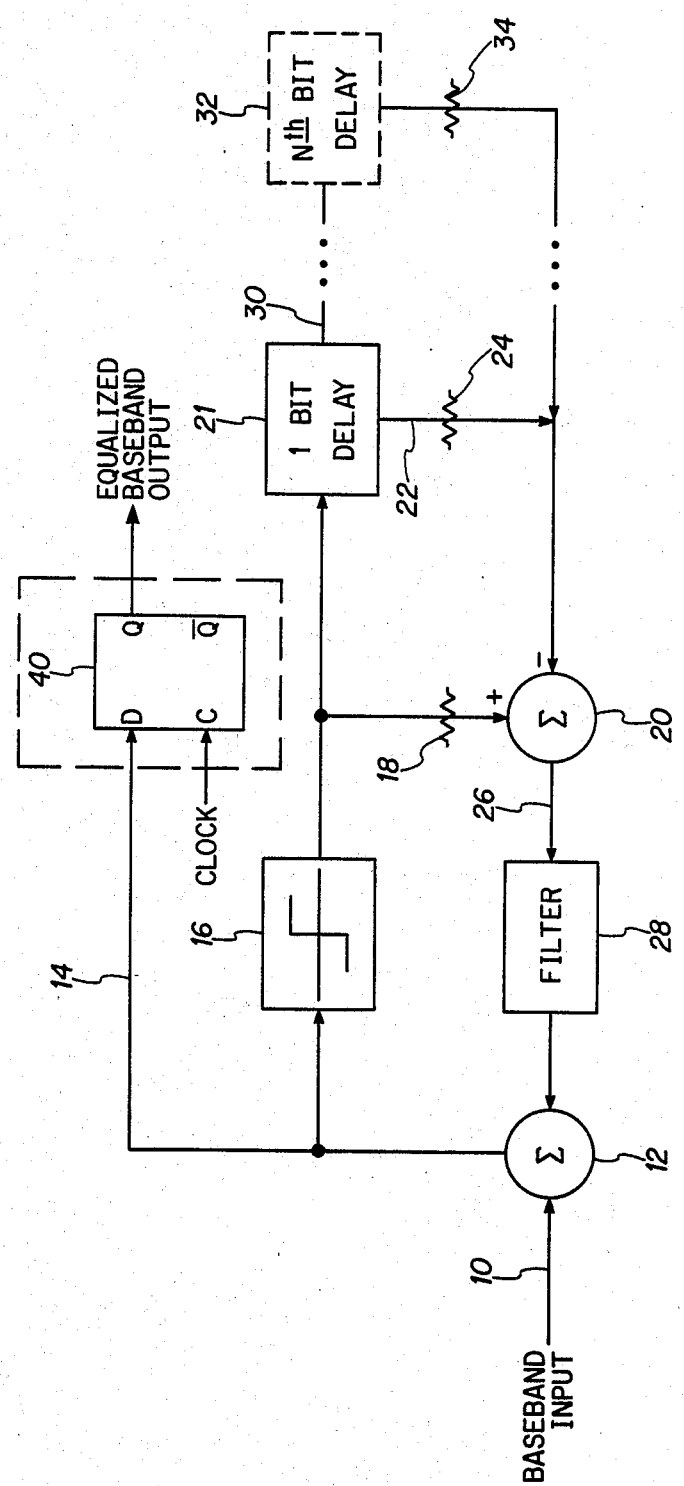

DECISION FEEDBACK EQUALIZING APPARATUS

THE INVENTION

The present invention is generally related to electronics and more specifically to compensation for intersymbol interference between adjacent pulses in a digital bit stream. Even more specifically, the present invention is related to equalization techniques utilized in reducing the intersymbol interference, and to enhancing the amplitude of the present bit pulse during the equalization process.

In the prior art transmission of digital data at relatively high rates over a linear channel that introduces significant intersymbol interference into its output signal, it has been common practice to remove this interference by means of either a linear feedforward or a nonlinear (decision feedback) equalizer in the receiver. The nonlinear equalizer often achieves an advantage in tolerance to additive noise over the corresponding linear equalizer. The conventional linear equalizer consists basically of a transversal filter which is conceptually a delay line tapped at T-Sec. intervals. Each tap is connected through a variable gain (which can be negative) to a summing bus. This scheme requires several taps to be effective in removing intersymbol interference. Moreover, a partial response signal resulting from bandwidth restriction will not become a full response signal using this type of equalizer. Thus, only the intersymbol interference will be removed.

The conventional nonlinear or decision feedback technique is similar to the above except that the transversal filter is used after a decision is made. In this approach, it may be assumed that at a sampling moment T, a decision is taken about the pulse polarity as represented by H(T). The interference which might be caused by the pulse in succeeding pulses can be eliminated by subtracting a compensation pulse represented by G(T) from H(T) after the decisions. Thus, pulse G(T) compensates H(T) at all successive decision moments. The signal loss due to bandwidth restriction will not be recovered in this case either.

The present invention is a basic concept and is discussed in more detailed form as to specific implementations for practicing the invention in copending applications 82ET49 and 83CR94 filed on the same date as the present application. These copending application use the concepts presented herein and differ in that they deal with the problem of implementing the invention in a real world practical, cost-efficient and component efficient approach, rather than the idealized and mathematically correct approach of the present disclosure.

The present invention recognizes that by using positive nonlinear or decision feedback with no delay in combination with conventional nonlinear or decision feedback, not only can the intersymbol interference resulting from pulse spreading to adjacent bits be removed, but in addition, the peak of the present pulse may be enhanced to obtain a full response signal and thereby produce maximum "eye" opening in the resulting equalized and compensated signal. Thus, the present invention is a generalized implementation for processing a digital pulse stream by adding, to the present pulse stream, a portion of the present bit and subtracting portions of delayed (previously occurring) bits. The adding of the present bit is accomplished through the above-referenced positive decision feedback and the subtracting of the delayed bits is through the use of known decision processing techniques. Before this feedback is applied, it is filtered to shape the spectrum of the signals being fed back to give a spectrum, which when added to the original one, results in a raised cosine spectrum for the output data. For one embodiment of the inventive concept a single pole high pass filter can be used to approximate the required frequency response.

It should be realized throughout this discussion that when I use the term one bit delay, I am talking about a time delay equal to the time between the start of adjacent data bits of information.

It is, therefore, an object of the present invention to provide an improved decision feedback equalization approach to reducing intersymbol interference in a pulse bit stream, while simultaneously enhancing the amplitude of the pulses in the bit stream.

Other objects and advantages of the present invention may be ascertained from a reading of the specification and appended claims in conjunction with the single drawing which shows a block diagram of the inventive concept.

BRIEF DESCRIPTION OF THE DRAWING

The FIGURE shows a block diagram for improving decision feedback equalization.

DETAILED DESCRIPTION

In the drawing, a baseband input signal is supplied on a lead 10 to a summing means 12, which provides an output on a lead 14. Lead 14 provides an equalized baseband output signal to a clocked decision device 40 which provides final decision and square output pulses as well as supplying a signal to an unclocked decision block 16. An output of decision block 16 is fed through a signal level weighting circuit element or tap gain 18 to a summing means 20. The output of decision block 16 is also supplied to a one data bit delay block 21 which supplies output signals on a lead 22 and through a tap gain adjustment signal level weighting circuit element or feedback gain adjustment 24 to a second input of summing means 20. As will be noted, the two inputs to summing means 20 have positive and negative (or inverting) inputs so that one signal is subtracted while the other is added. An output from summing means 20 is supplied on a lead 26 to a filter 28. The filter 28 provides an alteration in the spectrum of the signals being supplied therethrough to a spectrum, which if added to the original one being supplied on lead 10 results in a raised cosine spectrum on lead 14. This filter 28 should be chosen to have small delay to minimize the time delay of the positive feedback enhancement signal.

An output of one data bit delay 21 may be supplied as an option on a lead 30 to a dash line set of blocks represented by 32. The block 32 may supply time delays equivalent to one or more additional data bits if additional equalization is desired. Such additional delay is not always necessary and depends on the compensation required and the pulse spreading or intersymbol interference that occurs in the waveband limiting circuitry and apparatus prior to lead 10. In any event, the output of the one or more blocks 32 is supplied through circuit element(s) 34 and supplied along with the signals from one bit delay 21 to the summing means 20.

OPERATION

A train of data pulse signals is input on lead 10. These signal pulses may be nonreturn-to-zero. The signals are summed in summing means 12 with feedback signals and output on lead 14. Although upon initial application of the signals, they will not be equalized, the feedback arrangement will commence performing the equalization of the signals. As will be realized, the first signal pulse does not need to be equalized since there is no previous pulse spreading causing distortion in the signal. In any event, the output signal on lead 14 is initially detected by the decision logic device 16, which provides an output whenever the input exceeds a predetermined level threshold in either direction of polarity and thus performing an unclocked decision. The output of the decision detection device 16 is then returned through signal weighting means 18 to the summing means 20 where it is output through the shaping filter 28 to be supplied as part of the feedback signal to summing means 12. The equalized output on lead 14 is finally detected in a clocked decision element 40. The remainder of the circuitry to the right performs in typical decision feedback equalization format and delays the signal in delay means 21 and returns it through circuit element 24 so that it subtracts from the resulting feedback signal supplied as positive feedback through element 18. If the pulse spreading is so severe that distortion from data bits in addition to the immediately previous pulse bit occurs, additional delay, such as obtained from block 32, may be added and the components attributable to these further previous pulse bits can be used to compensate the amplitude of the present signal.

Whether the device uses information from only one previous bit, or from a multiplicity of previous bits of information to subtract from the present signal, is dependent upon the amount of intersymbol interference present and the design limitations of downstream equipment, and what eye pattern and amplitude requirements this downstream equipment has in the further processing of input signals. As will be realized, this subtraction will reduce the amplitude of the incoming signal and can reduce the amplitude of the signal so that it is indistinguishable from the noise. The present invention uses the positive decision feedback supplied from element 18 and immediately supplies this information to enhance the amplitude of the present bit. The filter 28 must be of such a design that there is no appreciable time delay to the enhancing signal supplied through circuit element 18. The enhancement provided by the positive decision feedback is what returns the signal to an amplitude approximating the original pulse train amplitude. Thus, the positive decision feedback enhancing signal and the subtractive intersymbol interference feedback signals complement each other, in that the second removes the effects of pulse spreading from previous pulses, and the first enhances the amplitude of the signal in an attempt to return it to its original amplitude condition.

It is important to realize that the addition of the feedback signals must be coherent at all frequency components. Therefore, the shaping filter 28 must not introduce any group delay.

The present invention was designed for use in an environment where the supplied signal was bandwidth limited and the frequency response was nearly Gaussian. However, the inventive concept is applicable to any band limited digital system and is not restricted to Gaussian responses.

It should be realized that while it is most desirable that the filter 28 have no appreciable delay, from a practical standpoint there will be some delay in filter 28. Thus, the one data bit delay of block 21 will be some amount less than a time equivalent to one bit by the delay in the decision block 16 and the delay in filter 28. However, for all practical purposes, and including the language in the claims, the delay in block 21 is equivalent to the time period of one bit.

While I have shown a specific connection of blocks to perform my inventive concept, I wish to be limited not by the embodiment shown, but only by the scope of the appended claims, wherein I claim:

1. The method of equalizing a digital data bit in a digital pulse stream comprising the steps of:
   continuously level detecting a summed digital first signal to be equalized and outputting a positive decision feedback and further square pulse opposite phase second and third signals respectively each indicative in polarity of the value of said first signal relative a reference;
   time delaying said third signal by an amount equivalent to the time between commencement of adjacent data bits to produce a delayed fourth signal;
   summing said second and fourth signals in a weighted algorithm to produce a composite feedback signal; and
   summing said composite feedback signal with a digital pulse signal to be equalized to produce said summed first signal, said summed first signal providing equalized output information.

2. The method of claim 1 comprising in addition the step of:
   time delaying said third signal by amounts equivalent to a multiple of the one data bit time delay to produce multiple delayed signals in addition to said fourth signal; and
   summing said multiple delayed signals with said second and fourth signals to form said composite signal.

3. Apparatus for equalizing a digital data bit stream comprising, in combination:
   level detecting first means for enhancing the logic level of the present bit in a digital data bit stream through the use of a substantially non-time delayed positive decision feedback signal obtained through level detection of the present bit in the data bit stream; and
   second means for neutralizing intersymbol interference on the present bit, the interference being due to previous bit pulse widening, by delaying a signal, obtained from said first means as generated through level detection and of a phase opposite said positive feedback signal, by a time corresponding to its time of occurrence relative the present bit and applying the delayed signal in a feedback manner to the digital bit stream simultaneous with the positive feedback signal.

4. The method of non-linearly equalizing a digital bit pulse stream comprising the steps of:
   generating a substantially non-time delayed logical level based decision feedback first signal based on the amplitude of the present bit in a digital bit stream for enhancing the amplitude of the present bit in the digital bit pulse stream;
   generating a time delayed logical level based decision feedback second signal for reducing intersymbol interference; and combining said first and second signals and incorporating them in a feedback manner with the digital bit pulse stream to modify the characteristics thereof.

5. The method of restoring pulse amplitude during decision processing delayed feedback intersymbol interference equalization of a digital pulse bit stream comprising the steps of:
- logic level decision detecting the amplitude of the present bit in a pulse bit stream;
- generating a substantially non-time delayed square pulse first signal in accordance with said detection; and
- returning said first signal, as a positive feedback signal, to the pulse bit stream without delay to enhance present bit amplitude.

6. Apparatus for equalizing a digital data bit in a digital signal stream comprising, in combination
- level detecting first means for detecting a summed first signal to be equalized and outputting a positive feedback and further square pulse opposite phase second and third signals respectively each indicative in polarity of the value of said first signal relative a reference;
- time delaying second means, connected to said first means, for delaying said third signal by an amount equivalent to the repetition rate for one data bit to produce a delayed fourth signal;
- summing third means, connected to said first and second means, for summing said second and fourth signals in a weighted algorithm to produce a composite feedback signal;
- signal input fourth means for supplying a fifth signal to be equalized; and
- summing fifth means, connected to said first, third and fourth means, for summing said composite feedback signal with a digital pulse signal to be equalized to produce said summed first signal, said summed first signal providing equalized output information.

7. Apparatus as claimed in claim 6 and comprising in addition:
- time delaying sixth means for delaying said third signal by amounts equivalent to a multiple of the time between adjacent bits for one data bit to produce multiple delayed signals in addition to said fourth signal; and
- seventh means, acting in conjunction with said third means, for summing said multiple delayed signals with said second and fourth signals to form said composite signal.

8. The method of equalizing a digital data bit stream comprising the steps of:
- enhancing the logic level of the present bit in a digital data bit stream through the use of a substantially non-time delayed positive feedback signal obtained through level detection of the present bit in the data bit stream; and
- neutralizing intersymbol interference on the present bit, the interference being due to previous bit pulse widening, by delaying a signal, obtained through said level detection and of a phase opposite said positive feedback signal, by a time corresponding to its time of occurrence relative the present bit and applying the delayed signal in a feedback manner to the digital bit stream simultaneous with the positive feedback signal.

9. Apparatus for equalizing a digital data bit stream comprising in combination:
- first means for supplying a digital data bit stream to be equalized;
- level detecting second means, connected to said first means for receiving said bit stream therefrom, for providing a positive decision feedback signal, for enhancing the logic level of the present bit in said digital data bit stream, obtained through level detection of the present bit in the data bit stream;
- level detecting third means, connected to said first means, for providing a further feedback signal, for neutralizing intersymbol interference on the present bit, by delaying a signal, obtained through level detection and of a phase opposite said positive decision feedback signal, by a time corresponding to its time of occurrence relative the present bit; and
- fourth means, connected to said second and third means, for summing said positive decision and further feedback signals and applying same in a feedback manner to the digital bit stream to be equalized.

10. Apparatus for non-linearly equalizing a digital bit pulse stream commprising, in combination:
- first means for generating a substantially non-time delayed logical level based desision feedback first signal based on the amplitude of the present bit for enhancing the amplitude of the present bit in a digital bit pulse stream;
- second means for generating a time delayed logical level based decision feedback second signal for reducing intersymbol interference; and
- third means for combining said first and second signals and incorporating them in a feedback manner with the digital bit pulse stream to modify the characteristics thereof.

11. Apparatus as claimed in claim 10 wherein said third means includes single pole filtering means for modifying the characteristics of the signal passing therethrough whereby said digital bit pulse stream has a raised cosine frequency spectrum.

12. Apparatus for restoring pulse amplitude during decision processing delayed feedback intersymbol interference equalization of a digital pulse bit stream comprising, in combination:
- first means for logic level decision detecting the amplitude of the present bit in a pulse bit stream; and
- second means for generating a square pulse first signal in accordance with said detection;
- third means for returning said first signal, as a positive decision feedback signal, to the pulse bit stream without any substantial time delay to enhance present bit amplitude.

* * * * *